(12) United States Patent
Miura et al.

(10) Patent No.: US 7,198,078 B2
(45) Date of Patent: Apr. 3, 2007

(54) FILLER PIPE

(75) Inventors: Natsushi Miura, Aichi (JP); Zenichi Yasuda, Aichi (JP); Masahiro Ando, Aichi (JP); Tomokazu Hori, Aichi (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 308 days.

(21) Appl. No.: 10/880,957

(22) Filed: Jul. 1, 2004

(65) Prior Publication Data
US 2005/0005998 A1   Jan. 13, 2005

(30) Foreign Application Priority Data

Jul. 4, 2003   (JP) ............................ P2003-191851
Jan. 13, 2004  (JP) ............................ P2004-005609

(51) Int. Cl.
B65B 1/04 (2006.01)

(52) U.S. Cl. ...................... 141/286; 141/99; 141/285; 220/86.2

(58) Field of Classification Search ................ 141/18, 141/98, 99, 285, 286, 348–350, 374; 220/86.2; 138/111–121
See application file for complete search history.

(56) References Cited

U.S. PATENT DOCUMENTS 4,122,968 A * 10/1978 Germain ..................... 220/86.2
6,305,408 B1 * 10/2001 Goto et al. .................. 137/351

FOREIGN PATENT DOCUMENTS

| JP | U-60-165219 | 11/1985 |
|---|---|---|
| JP | U-2-36687 | 3/1990 |
| JP | A-2000-85381 | 3/2000 |
| JP | A-2000-159296 | 6/2000 |

* cited by examiner

Primary Examiner—Timothy L. Maust
(74) Attorney, Agent, or Firm—Posz Law Group, PLC

(57) ABSTRACT

A filler device or pipe comprising: a filler neck including a pouring inlet, a neck connection portion, and a connection pipe which includes a bellows part and which is connected to the neck connection portion. Fuel is injected through the pouring inlet and fed into the fuel tank through a filling passage of the filler device. The filler device further includes an inner tube including a tube body formed of a flexible elastomer material, which is inserted into the connection pipe. The tube body and the connection pipe having cooperating engaging members for holding the tube body within the connection pipe. The tube body covers an inner wall of the bellows part.

12 Claims, 8 Drawing Sheets

FILLER PIPE

The present application is based on Japanese Patent Applications No. 2003-191851 and No. 2004-5609, the entire contents of which are incorporated herein by reference.

BACKGROUND OF THE INVENTION

1. Field of the Invention

The present invention relates to a filler device or filler pipe for guiding fuel into a fuel tank from a fuel gun.

2. Related Art

The filler device couples an inside of an inlet box and an internal space of the fuel tank so as to communicate therebetween. An upstream end of the filler device is projected in the inlet box. A pouring inlet is formed on the upstream end of the filler device. The fuel provided from the fuel gun is injected into the fuel tank through an inside of the filler device.

As such the filler devices, a resin inlet pipe on which a bellows part is formed is conventionally known. Although this inlet pipe is advantageous in its lightweight and flexibility for arrangement, the bellows part can result in a high flow resistance in feeding the fuel, disturbing a smooth filling operation.

To solve the above problem, as shown in Japanese patent publication No. JP 2000-85381, it is known that a flat portion is formed on a part of the bellows part on which the fuel comes into abutment in the filling operation. However, flexibility of the pipe is decreased by providing the flat portion partially formed on the bellows part and the arrangement of the pipe becomes more limited.

Further, in order to reduce the flow resistance, it is also known a double tubular structure, in which a straight tube is inserted in the inside of the bellows part while not being fixed, as shown in Japanese Utility Model Publication No. JP H02-36687U. However, the tube having the double tubular structure has not been studied in detail for the application to the inlet pipe, conventionally.

Japanese patent publication JP 2000-159296A and Japanese utility model publication JP S60-165219U disclose filler devices in which an inner diameter of the filler device varies along a longitudinal direction of the device. A filler device as shown in these publications is provided with a first larger diameter section, a smaller diameter section and a second larger diameter section from the upstream side to the downstream side. In such the filler device, the fuel is provided in the first larger diameter section at first, and then it is narrowed in the smaller diameter section. The fuel is diffused again by the second larger diameter section.

In the filler devices, the pipe is often curved downwardly in a vicinity of the pouring inlet due to the arrangement of the pipe between the inlet box and the fuel tank. When the fuel ejected from the fuel gun comes into abutment on such the curved part of the pipe, and bounces back toward the pouring inlet. Therefore, the fuel is not fed easily to the filler device from the fuel gun. In other words, the fuel is not well introduced into the filler device.

In cases of the filler devices shown in JP 2000-159296A and JP S60-165219U, the fuel ejected from the fuel gun is fed into the first larger diameter section at first. Accordingly, the fuel is rapidly diffused from the leading end of the fuel gun to an inner passage of the first larger diameter section. If a curved part is arranged in a middle of the first larger diameter section, the flow of fuel abuts with the curved part while being diffused. In this case, the fuel can bounce back more easily. Therefore, the introduction of the fuel to the filler device becomes even worse.

SUMMARY OF THE INVENTION

To solve the above problems, the invention is directed to provide a filler device in which the fuel is easily introduced. More specifically, the present invention is directed to provide a filler device in which a fuel flows smoothly while keeping high flexibility for the arrangement of the inlet pipe.

The invention provides a filler device comprising:

a filler neck including a pouring inlet through which a fuel is injected and a neck connection portion;

a connection pipe including a pipe connection portion to which the neck connection portion is connected and a curved part (bellows part) which is curved along a filling passage to a fuel tank;

wherein the fuel injected through the pouring inlet is fed into the fuel tank through the filling passage, the connection pipe is provided with a pipe-side engaging portion on a back side of the pipe connection portion, the filler device further includes an inner tube including a tube body formed of a flexible elastomer material and inserted into the connection pipe, and a tube-side engaging portion projecting from an outer circumference at an end of the tube body, the inner tube is configured so that the tube body covers an inner wall of the bellows part and that the tube-side engaging portion is engaged with the pipe-side engaging portion, when the inner tube is inserted into the connection pipe, reaching to the back side of the pipe connection end.

According to the filler device of the invention, although the bellows part is formed in the connection pipe for ease in the arrangement of the connection pipe along the curved filling passage, the flow resistance in the connection pipe remains low, since threads on internal wall of the bellows part are covered with the inner tube. Therefore, the fuel in the filling passage flows smoothly. In other words, a turbulence, which causes decrease of the flow rate, does not appear in the bellows part of the connection pipe. Smooth filling operation is realized.

Since the inner tube is formed of a flexible elastomer material, it can be inserted into the connection pipe that has a curved shape. Further, when the inner tube is inserted into the connection pipe, a tube-side engaging portion which is formed on an outer circumference at a connection end of the inner tube is engaged with a pipe-side engaging portion. Therefore, a positioning operation for these members can be performed easily and reliably. Furthermore, by previously setting the inner tube in a predetermined shape in accordance with the filling passage, the inner tube does not undergo a buckling at its insertion and a bending due to material degradation caused by swelling of the fuel. Therefore, a clogging due to decrease in the passage area does not occur.

Preferably, the pipe-side engaging portion may be configured to expand a part of the connection pipe. Moreover, the connection pipe may be provided with plural bellows parts and the inner tube may be configured to cover the bellows part which is located on the most upstream side. By this construction, the inner tube covers the bellows part located on the upstream side of the connection tube where the flow rate of the fuel is relatively high. Besides, the insertion operation of the inner tube can be performed easily, because it is not necessary to insert the inner tube into a passage that is curved intricately.

The invention also provides a filler device which includes an upper end to which a fuel gun is inserted and a lower end which communicates with a fuel tank, wherein at least one curved part is formed between the upper end and the lower end, the filler device comprising:

a smaller diameter section disposed over a region between a leading end of the fuel gun and the curved part which is located in the most upstream side, an outer circumferential surface of the smaller diameter section being exposed in an exterior of the filler device; and a larger diameter section continuously disposed on a downstream side of the smaller diameter section and having a larger inner diameter than an inner diameter of the smaller diameter section, wherein the inner diameter of the smaller diameter section is set to be more than 100% and not more than 135% with respect to an outer diameter of the leading end of the fuel gun.

The inner diameter of the smaller diameter section is set to be slightly larger than the outer diameter of the leading end of the fuel gun. Therefore, the fuel ejected from the fuel gun is hardly diffused. Further, since the fuel is hardly diffused, turbulence in the flow of the fuel hardly occurs. Besides, the smaller diameter section extends so as to cover between a position corresponding to the leading end of the fuel gun and the curved part located on the most upstream side. By this construction, the fuel is hardly bounced back at the curved part. As a result, the decrease in the flow rate of the fuel can be prevented toward a downstream side of the curved part.

Further, on the downstream side of the smaller diameter section, the fuel flows through the passage while involving the air. Therefore, the apparent volume of the fuel is increased by the involved air. Accordingly, the fuel flows less easily. In this respect, the second larger diameter section is continued to the smaller diameter section, so that the fuel can flow easily even after the volume of the fuel is increased by involving the air.

By the above construction, the fuel can easily flow in the filler device of the invention. Therefore, the fuel can be easily introduced in the filling operation.

The outer circumferential surface of the smaller diameter section of the filler neck according to the invention may exposed to the out side of the filler device. That is, in this case, any component such as bellows member does not arranged on the outer circumferential surface of the smaller diameter section. Therefore, the outer diameter of the filler device can be set relatively small.

The followings are reasons to set the inner diameter of the smaller diameter section to be more than 100% and not more than 135% of the outer diameter of the leading end of the fuel gun. That is, if the inner diameter of the smaller section is not more than 100%, it becomes less easy to hold the leading end of the fuel gun to the filler device so that the fuel cannot be introduced well. On the other hand, if the inner diameter of the smaller diameter section goes beyond 135%, the fuel ejected from the fuel gun is diffused and the introduction force into the filler device becomes weaker. The clogging of the fuel may be caused.

Preferably, the inner diameter of the second larger diameter section is set to be more than 110% and not more than 150% of the inner diameter of the smaller diameter section.

The followings are reasons to set the inner diameter of the second larger diameter section to be not less than 110% and not more than 150% of the inner diameter of the smaller diameter section. That is, if the inner diameter of the second larger diameter section is less than 110%, the fuel flows less easily after the apparent volume is increased. On the other hand, the inner diameter of the second larger diameter section goes beyond 150%, its outer diameter becomes too large and a large space is required for arranging the filler device.

Preferably, curvature of the curved part on the most upstream side is set to be not more than 140. The filler device of the invention is suitable for applying to a filler device with smaller curvature of the passage. That is, even if the curvature of the passage is severe, the fuel can be introduced well in the filler device of the invention. Incidentally, if the curvature is more than 140, the flow resistance of the pipe cannot be very high. Accordingly, the advantage of the invention is hardly accomplished.

As described above, the invention provides a filler device in which the fuel can be introduced well or easily.

DETAILED DESCRIPTION OF THE PREFERRED EMBODIMENTS

First Embodiment

The first embodiment of the invention is described below.

(1) Schematic construction of filler pipe (device) 10

Figure 1:
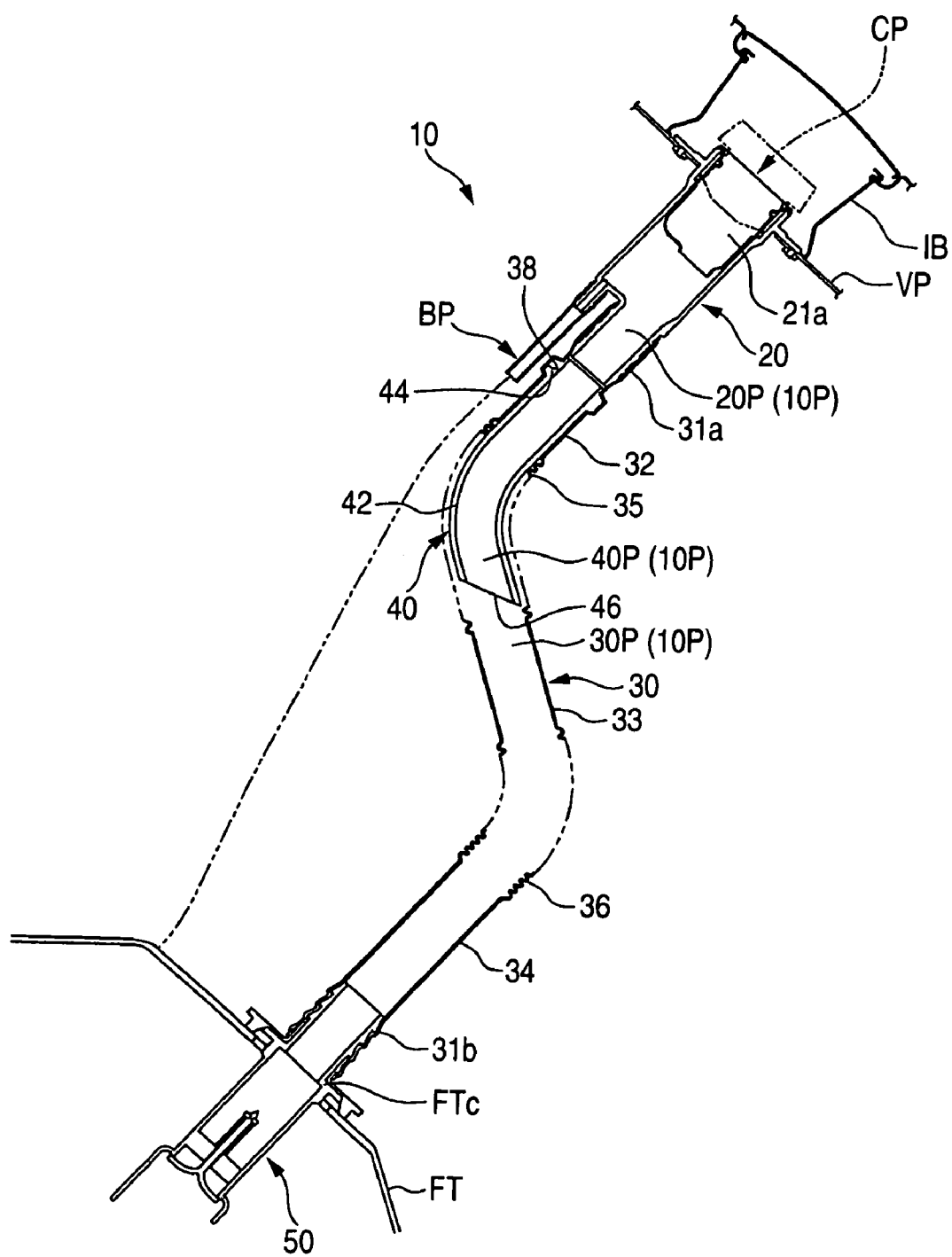
FIG. 1 is a schematic view showing a filler device according to first embodiment of the invention.

FIG. 1 is a schematic view showing a filler device according to the first embodiment of the invention. As shown in FIG. 1, the filler device 10 is provided to introduce a fuel fed by a fuel gun (not-shown) from an inlet box IB to a fuel tank FT. The filler device 10 is provided with a filler neck 20, a connection pipe 30 connecting the filler neck 20 to the fuel tank FT, an inner tube 40 inserted into the connection pipe 30, a check valve 50 for preventing liquid fuel or fuel gas from being emitted to outside due to a back-flow of the fuel, a fuel cap CP, and a breather pipe BP for aerating the fuel tank FT to the outside thereof during the filling operation. In other words, the inlet box IB is mounted on a vehicle body panel VP of an automobile, and the filler neck 20 is attached to the inlet box IB. The connection pipe 30 is connected to the fuel tank FT so as to be curved along a filling passage. At the filling operation, the fuel cap CP is detached from the filler neck 20 and the fuel is injected to the filler neck 20. The fuel is fed into the fuel tank FT through a filling passage 10P which is constituted by the connection pipe 30 and the inner tube 40. Detailed constructions for each component of the filler device 10 are described below.

(2) Constructions of the Components (2)-1: Filler Neck 20

Figure 2:
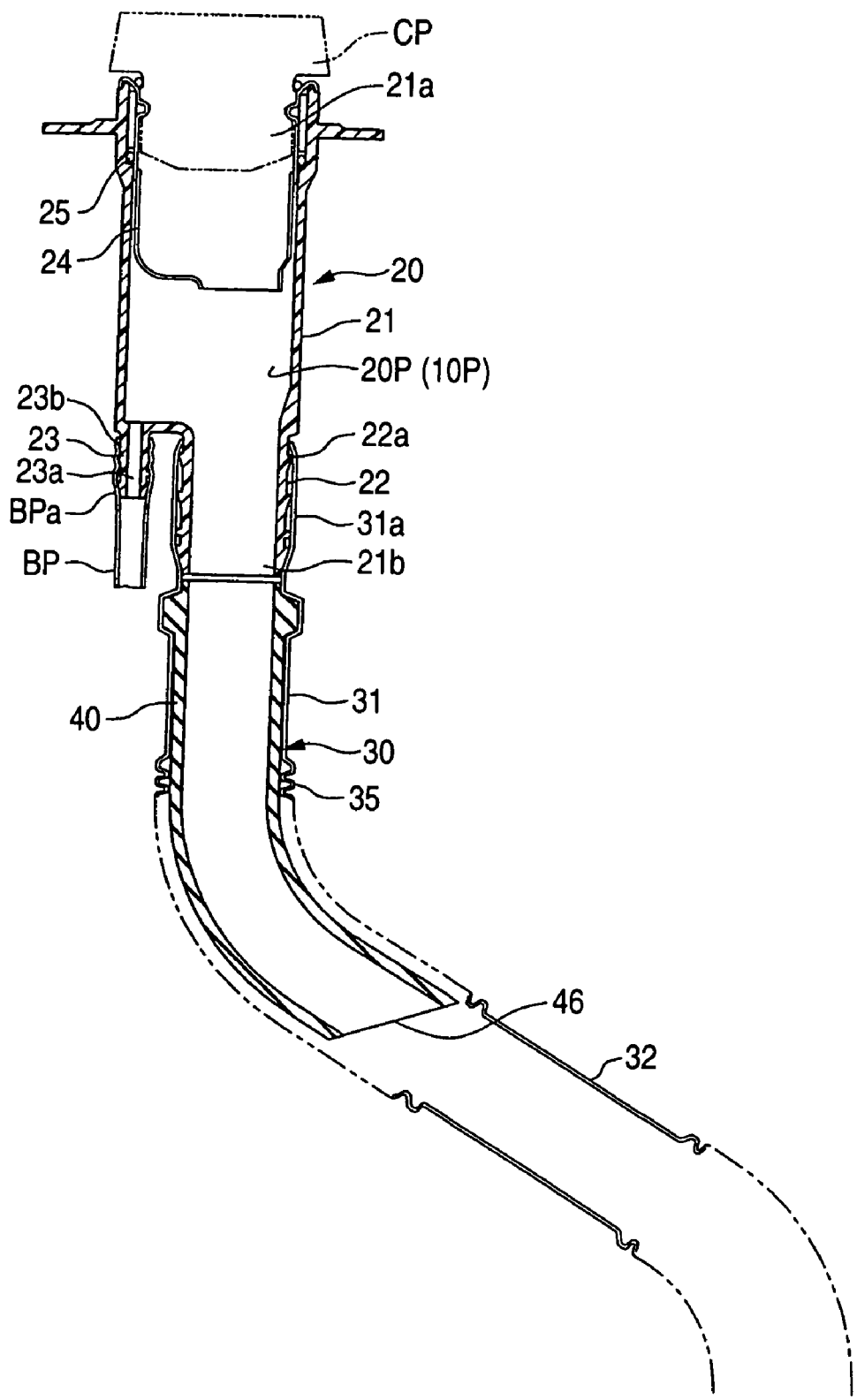
FIG. 2 is an enlarged sectional view showing a part of the filler neck 20 and the connection pipe 30 shown in FIG. 1.

FIG. 2 shows an enlarged view showing a part of the filler neck 20 and the connection pipe 30 shown in FIG. 1. In FIG.

2, the filler neck 20 is provided with a neck body 21 which connects a pouring inlet 21a and a discharging outlet 21b so that a pouring passage 20P as a part of the filling passage 10P is formed. At a lower end of the neck body 21, a neck connection portion 22 having the discharging outlet 21b is formed for connecting with the connection pipe 30. On the outer circumference of the neck connection portion 22, plural annular projections 22a are formed to expand a pipe connection end 31a of the connection pipe 30 at a pipe connection portion 31, for preventing a pulling-out of the connection. Further, on the lower end of the neck body 21, a breather connection portion 23 having a breather opening 23a is formed for connecting with the breather pipe BP. On the outer circumference of the breather connection portion 23, plural annular projections 23b are formed to expand a pipe connection end BPa of the breather pipe BP, for preventing a pulling-out of the connection. Inside of the neck body 21, an attachment metal 24 is mounted so that the fuel cap CP can be detachably attached. A seal member 25 consisting of an O-ring is interposed between the attachment metal 24 and the inner wall of the neck body 21.

(2)-2 Connection Pipe 30

Figure 3:
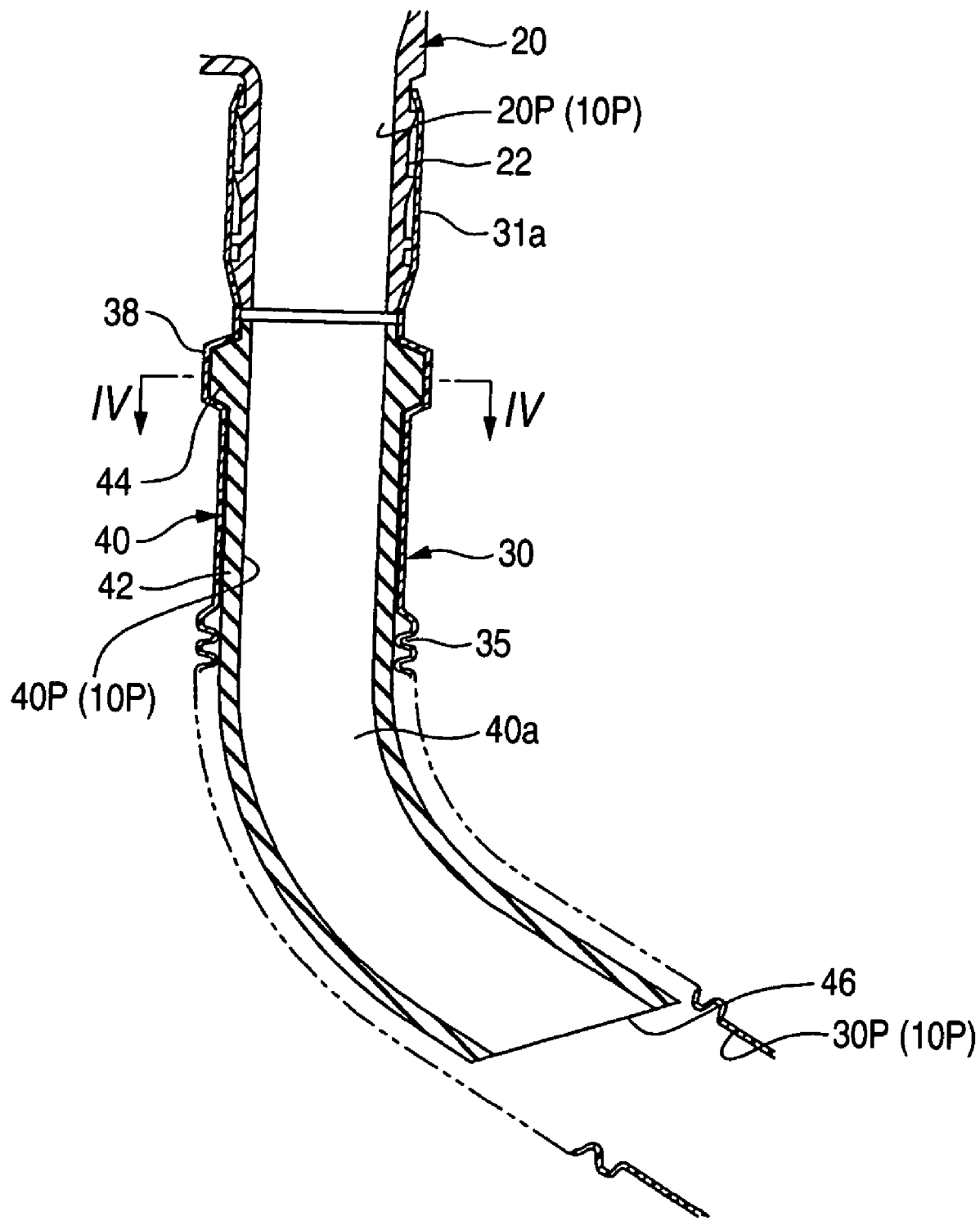
FIG. 3 is an enlarged sectional view showing a vicinity of the connection pipe 30 shown in FIG. 3.

In FIG. 1, the connection pipe 30 is provide as a resin pipe which connects the filler neck 20 and the fuel tank FT. The connection pipe 30 includes straight pipe parts 32, 33, 34 and bellows parts 35, 36 integrally formed among the straight pipe parts 32, 33, 34 so that the connection pipe 30 is curved in accordance with the filing passage. Inside of the connection pipe 30, a pipe passage 30P as a part of the filling passage 10P is formed. An end of the connection pipe 30 is provided with the pipe connection end 31a for connecting with the filler neck 20 and the other end of the connection pipe 30 is provided with a pipe connection end 31b for connecting with a connector FTc that is welded to the fuel tank FT. FIG. 3 is an enlarged sectional view showing a vicinity of the connection pipe 30 shown in FIG. 2. On a back side (downstream side) of the pipe connection end 31a of the connection pipe 30, a pipe-side engaging portion 38 is formed. The pipe-side engaging portion 38 is constituted with an annular space expanded from the pipe passage 30P by expanding the diameter of the pipe connection end 31a at a position to which the neck connection portion 22 of the filler neck 20 does not reach.

(2)-3 Inner Tube 40

Figure 4:
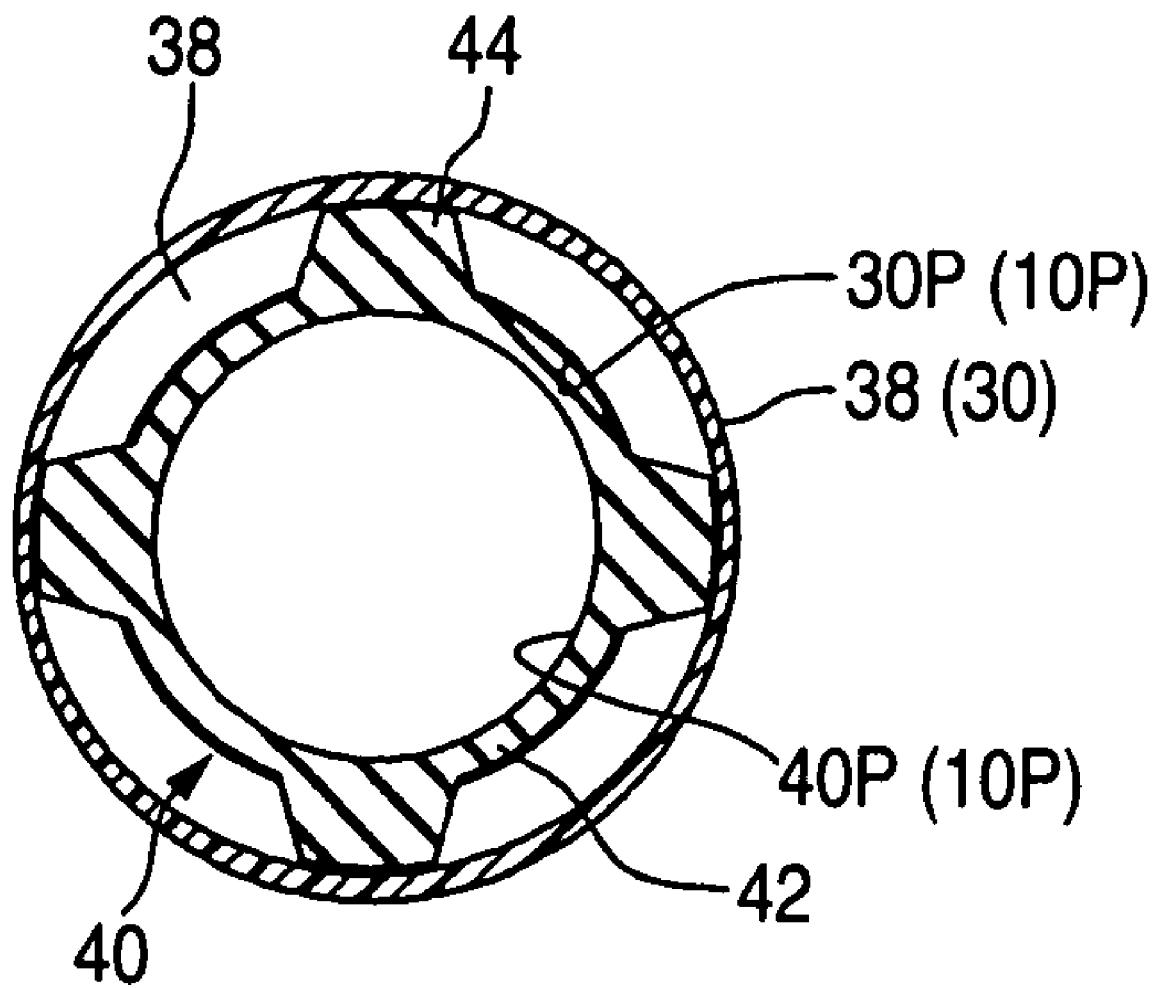
FIG. 4 is a sectional view taken along the line IV—IV in FIG. 3.

The inner tube 40 is inserted into the pipe passage 30P of the connection pipe 30 so that a tube passage 40P as a part of the filling passage 10P is formed. The inner tube 40 is provided with a tube body 42 formed of a flexible elastomer that is superior in fuel-resistance. For the flexible elastomer the following materials may be used: acrylonitrile-butadiene rubber (NBR), blended material of NBR and polyvinyl chloride (PVC), H-acrylonitrile-butadiene rubber (HNBR) and fluororubber (FKM), or the like. FIG. 4 is an enlarged sectional view taken along the line IV—IV in FIG. 3. As shown in FIGS. 3 and 4, tube-side engaging portions 44 are formed on an outer circumference at an end portion of the tube body 42. The tube-side engaging portions 44 are formed at four positions in equal interval of 90° in a circumferential direction of the inner tube 40, so as to be engaged with the pipe-side engaging portion 38 of the connection pipe 30. As shown in FIG. 3, the inner tube 40 is configured so that the tube body 42 covers threads on the inner wall of a bellows part 35 forming a curved part 40a and so that the tube-side engaging portions 44 are engaged with the pipe-side engaging portion 38, when the inner tube 40 is inserted into the pipe passage 30P.

The leading end of the inner tube 40 is provided with an inclined end 46, being cut off in a slanted manner. The included end 46 lowers friction against the inner wall of the connection pipe 30. As a result, a workability for inserting the inner tube 40 into the connection pipe 30 is improved.

(3) Operation and Effect of Filler Device at Filling Operation

In FIG. 1, by the filler device 10 according to the first embodiment, when the fuel is fed into the pouring inlet 21a of the filler neck 20, the fuel flows into the connection pipe 30 from the filler neck 20 and then flows in the inner tube 40 inserted into the connection pipe 30. Further, the fuel discharged from the inner tube 40 flows into the fuel tank FT through the check valve 50 from the connection pipe 30. Although the bellows part 35 is formed in the connection pipe 30, the fuel flows smoothly in the filling passage 10P since the flowing resistance in the passage remains low by covering the threads on the inner wall of the bellows part 35. As a result, a turbulence, which causes decrease of the flow rate, does not appear in the bellows part 35 of the connection pipe 30. Smooth filling operation is realized.

Figure 5:
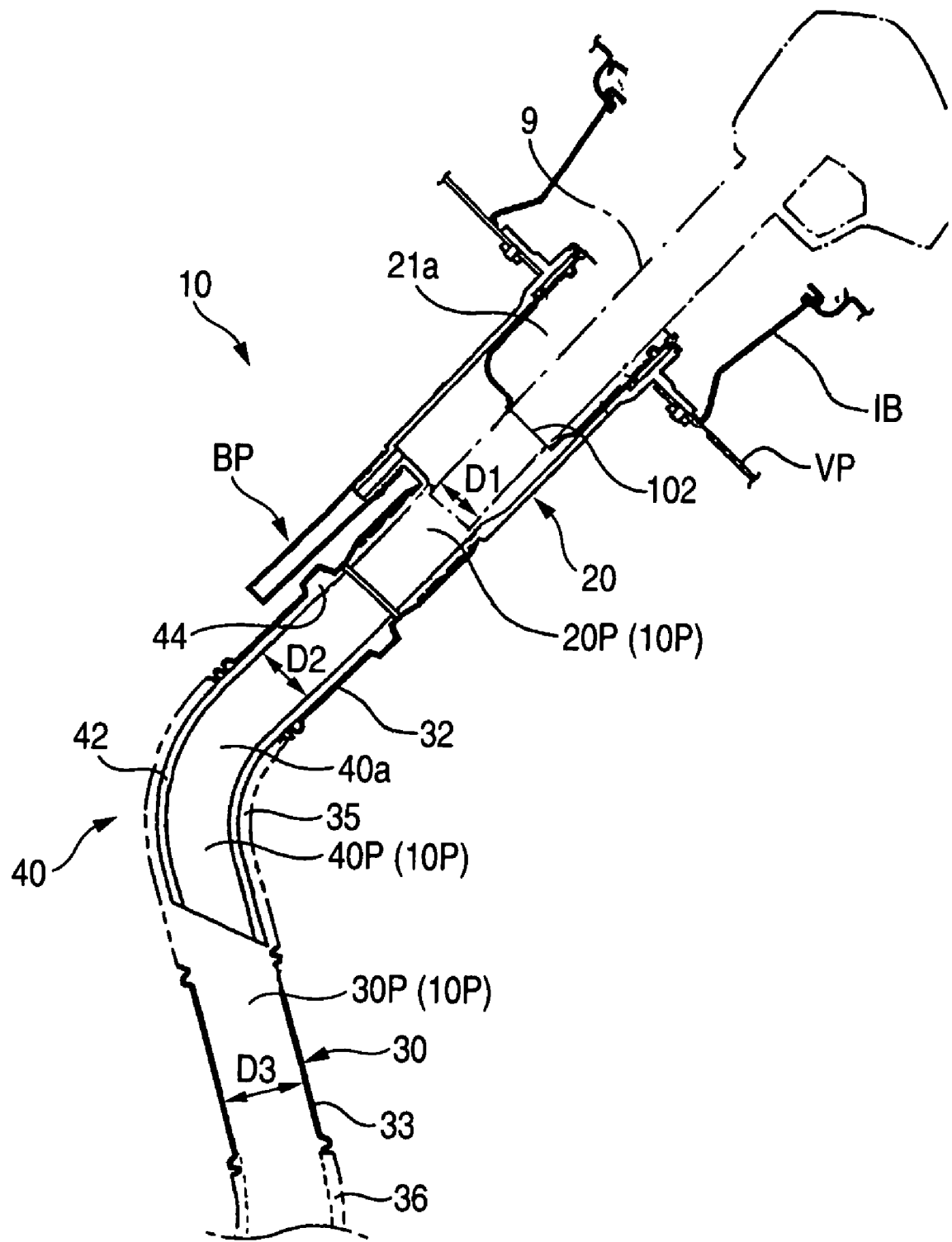
FIG. 5 is an enlarged view of the upper part of the filer device 10 when a fuel gun 9 is inserted.

FIG. 5 shows an enlarged view of the upper part of the filer device 10 when a fuel gun 9 is inserted. As shown in FIG. 5, the fuel gun 9 (shown with chain lines) is inserted into the filler neck 20 through the pouring inlet 21a. A leading end of the fuel gun 9 is inserted into the gun insertion port 102. Incidentally, an outer diameter D1 of the leading end of the fuel gun 9 is 20 mm.

The inner tube 40 is included in a smaller diameter section of the invention. As shown in FIG. 5, an inner diameter D2 of the inner tube 40 is 22 mm. That is, the inner diameter D2 of the inner tube 40 represents 110% of the outer diameter D1 of the fuel gun 9. A curved part 40a is formed in a section between a middle portion and the lower end of the inner tube 40 in the tube passage 40P. The curved part 40a corresponds to the curved part "which is located in the most upstream side" of the invention. A radius of curvature of the upstream curved part is 100.

The connection pipe 30 is included in a larger diameter portion of the invention. An inner diameter D3 of the connection pipe passage 30 (the inner diameter D3 corresponds to the inner diameter at root portions of the bellows part 36) is 26 mm. That is, the inner diameter D3 of the connection pipe 30 represents 118% of the inner diameter D2 of the inner tube 40. As described above, the upper end of the connection pipe 30 is fitted to the outer circumference of the inner tube 40. The downstream curved part 36 is provided between the upper end and the lower end of the connection pipe 30. The downstream curved part 36 has a bellows shape.

The fuel gun 9 is inserted into the filler neck 20 through the pouring inlet 21a. The leading end of the inserted fuel gun 9 penetrates through a gun insertion port 102 and abuts with the inner circumference of the inner tube 40. The fuel is ejected from the leading end of the fuel gun 9.

The fuel ejected from the fuel gun 9 is initially introduced into the inner tube 40 which has a small diameter than the other sections. Therefore, the fuel is hardly diffused. Further, since the fuel is hardly diffused, turbulence in the flow of the fuel hardly occurs. Besides, the leading end of the fuel gun 9 abuts with the inner circumference of the inner tube 40, and the curved part 40a is provided in the inner tube 40. In other words, the section between the leading end of the fuel gun 9 and the curved part 40a is formed to have the smaller inner diameter by the inner tube 40. Accordingly, the fuel is hardly bounced back at the curved part 40a. As a result, the decrease in the flow rate of the fuel can be prevented toward a downstream side of the curved part 40a.

(4) Manufacturing Process and Attachment Operation of the Filler Device 10

Next, a manufacturing process and attachment operation of the filler device 10 are described below.

(4)-1 Manufacturing Process of Connection Pipe 30

The connection pipe 30 may be manufactured by well-known brow forming method and corrugater forming method. For example, in the corrugater forming method, resin extruded-pipe bodies consisting of three layers are extruded and then the outer shape of the connection pipe 30 is formed by transporting loop-shaped molds on both side of the transportation line. At this time, the bellows parts 35, 36 and the pipe-side engaging portion 38 are formed. Then, a bending operation is conducted on the connection pipe 30 by bent at the bellows parts 35, 36 with the molds, there by shaped in accordance with the filling passage.

(4)-2 Manufacturing Process of Inner Tube 40

The inner tube 40 may be manufactured by various methods such as extruding method, injection molding method, and blow forming method or the like. For example, in the extruding method, after extruding a tube material formed of an elastomer or unvulcanized rubber, the pipe-side engaging portion 38 is shaped at an end of the tube material. Then the tube material is vulcanized to be shaped in a predetermined shape, after inserted into a mandrel and bent in the predetermined shape. In this method, the processes can be simplified by performing the vulcanization and the bending operation simultaneously.

(4)-3 Attachment of the Filler Device 10

First, the inner tube 40 is inserted into the pipe passage 30P of the connection pipe 30. In other words, lubrication assistant is applied on the outer circumferential surface of the inner tube 40 and then the inner tube 40, which is in a bent state, is inserted to a connection port of the connection pipe 30 so that the included end 46 is on the front side of the insertion. After that, the tube-side engaging portions 44 are pressed into the pipe-side engaging portion 38 so that the tube-side engaging portions 44 are engaged with the pipe-side engaging portion 38. At this time, even if the tube-side engaging portions 44 are abutted with the connection port of the connection pipe 30, the tube-side engaging portions 44 can be easily engaged by deforming the inner tube 40 radially inwardly, since the inner tube 40 itself is formed of the flexible elastomer material. Moreover, since the inner tube 40 which is formed of the flexible elastomer has a flexibility, even after it is set in a predetermined shape, the inner tube 40 can be easily inserted into the connection pipe 30 and is restored to the shape along the connection pipe 30 at the position to which the inner tube 40 is inserted. By this construction, the inner tube 40 is fitted so as not to be pull out from the connection pipe 30 in a state that the inner tube 40 is inserted into the connection pipe 30 in accordance with a curve of the bellows part 35.

At the insertion operation of the inner tube 40, the inner tube 40 is previously set in the predetermined shape in accordance with the curved shape of the connection pipe 30, workability is excellent so that the inner tube 40 is easily inserted into the connection pipe 30 which is previously curved. Further, no bucking of the inner tube 40 occurs during the insertion. Therefore, any part of the passage in the inner tube 40 is not narrowed.

Moreover, since the inner tube 40 is previously set in a predetermined shape in accordance with an attachment condition to the connection pipe 30, bending of the inner tube 40 due to material degradation by swelling of the fuel does not occur. Clogging due to decrease of the passage area does not occur either.

Furthermore, since the lubricant assistant is applied on the outer circumference of the inner tube 40, the inner tube 40 can be inserted into the connection pipe 30 smoothly.

Furthermore, at the leading end of the inner tube 40, the included end 46 is formed by cut-off in a slanted manner, the friction against the inner wall of the connection pipe 30 can be lowered so that the inner tube 40 is inserted into the connection pipe 30 smoothly.

(4)-4 Assembling of Filler Neck 20 etc.

Next, the connection pipe 30 is connected to the filler neck 20. In other words, after attaching the seal member 25 and the attachment metal 24 to the neck body 21, the pipe connection end 31a of the connection pipe 30 is press-fitted to the neck connection portion 22. At this time, the neck connection portion 22 is inserted only in a part corresponding to the pipe connection end 31a as an insertion margin so as not to overlap with the upper end of the inner tube 40. Therefore, the connection structure does not become complicated and is excellent in sealing property.

Then, the breather pipe BP is connected to the filler neck 20 by press-fitting the pipe connection end Bpa of the breather pipe BP into the breather connection portion 23 of the filler neck 20, and the check valve 50 is attached at the pipe connection end 31b of the connection pipe 30. By this process, an assembly of the filler device 10 is obtained. After that, the filler device 10 are arranged so as to have a predetermined filling passage and attached to the fuel tank FT at the pipe connection end 31b of the connection pipe 30 on an assembling line of an automobile.

In the assembling operation of the filler device 10, the inner tube 40 is not fixed with respect to the connection pipe 30 except the tube-side engaging portions 44. Therefore, the inner tube 40 does not disturb bending of the bellows part 35 and the flexibility for the arrangement of the filler device 10 is not deteriorated.

The invention is not limited to the above embodiment, but various modifications may be applied.

Figure 6:
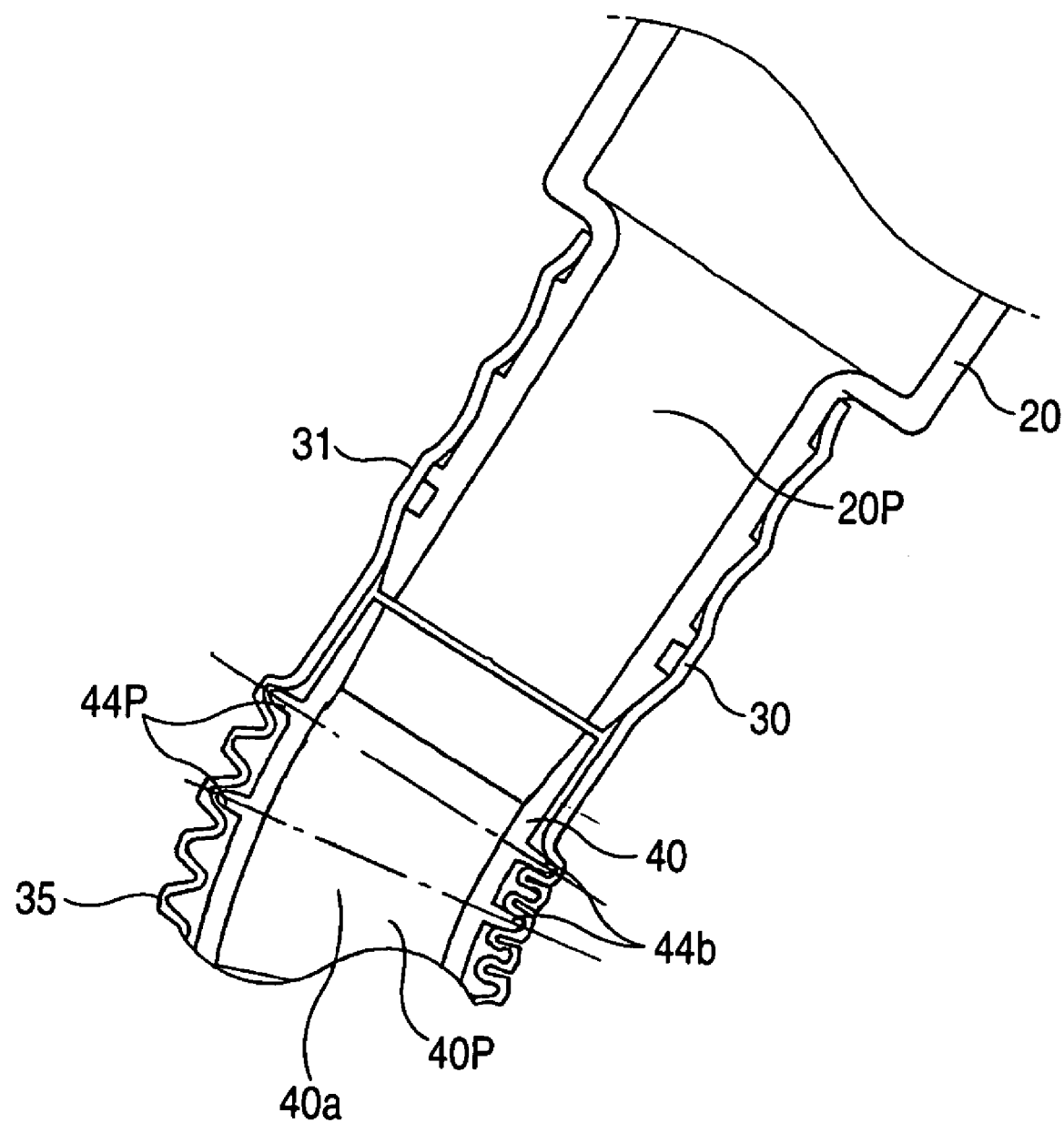
FIG. 6 is an enlarged view showing a vicinity of the connection pipe 30 in a modified example.

FIG. 6 shows a modified example in a connection between the connection pipe 30 and the inner tube 40.

In this example, the curved part 40a of the inner tube 40 is provided just after the filler neck 20. Therefore, the pipe connection portion 31 is formed in a short length. Corresponding to the curved part 40a, the bellows part 35 is formed just after the connection portion 31. The tube-side engaging portions 44b are formed as annular projections formed around the inner tube 40. The tube-side engaging portions 44b are engaged with the inner face of the bellows part 35, when the inner tube 40 is inserted into the pipe passage 30P. In other words, apart of the bellows part 35 serves as the pipe-side engaging portion. As shown in FIG. 6, the tube-side engaging portions 44b are arranged on the inner tube 40 in accordance with a curved form of the bellows part 35 so that the inner tube 40 and the connection pipe 30 are reliably coupled.

Although in the first embodiment, the tube-side engaging portions 44 of the inner tube 40 are integrally formed with the tube body 42 by the elastomer material, the invention is not limited to this configuration. The tube-side engaging portions 44 maybe formed as separate members and maybe attached to the tube body 42.

Second Embodiment

Figure 7:
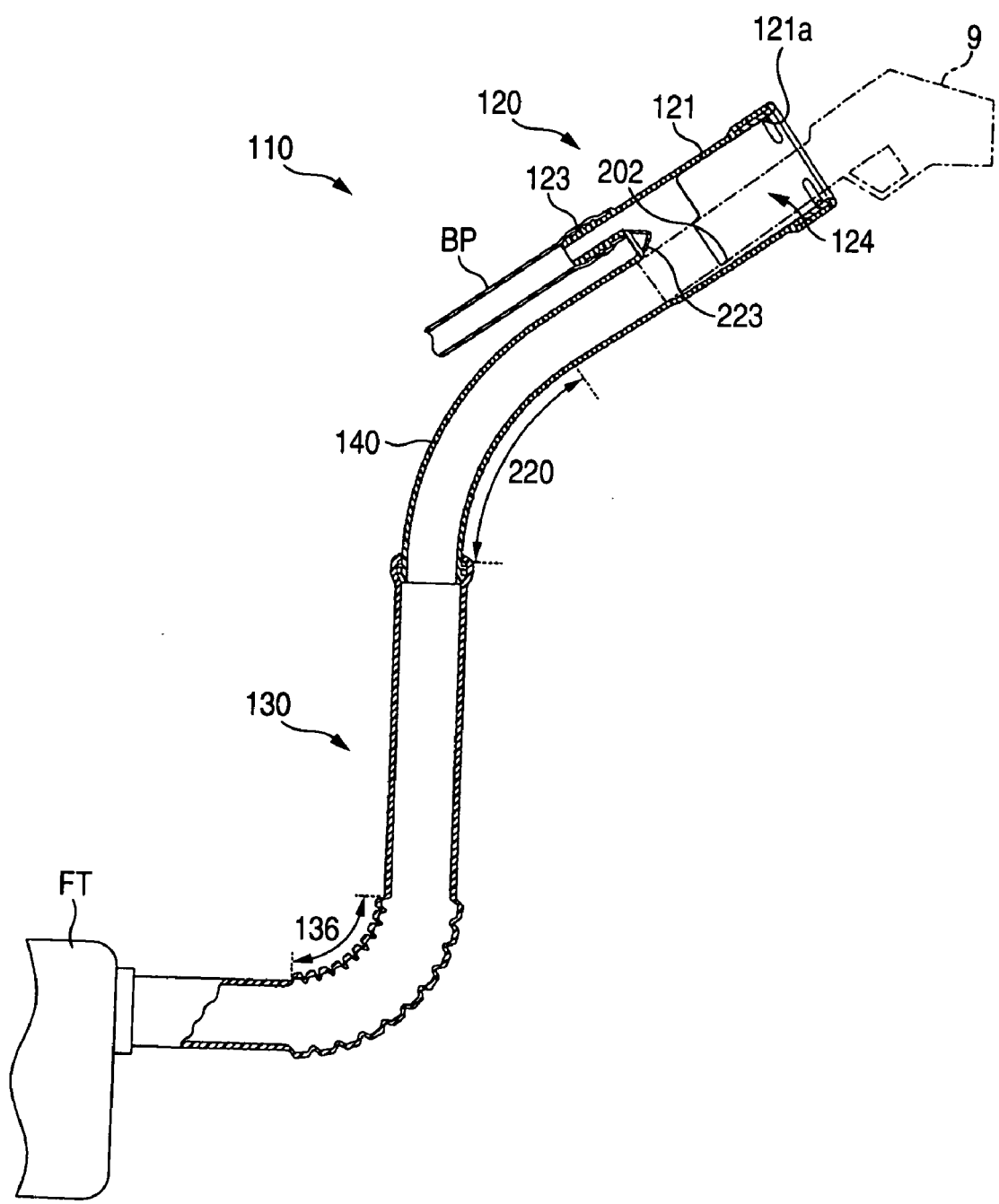
FIG. 7 is a longitudinal sectional view of a filler device according to second embodiment of the invention.
Figure 8:
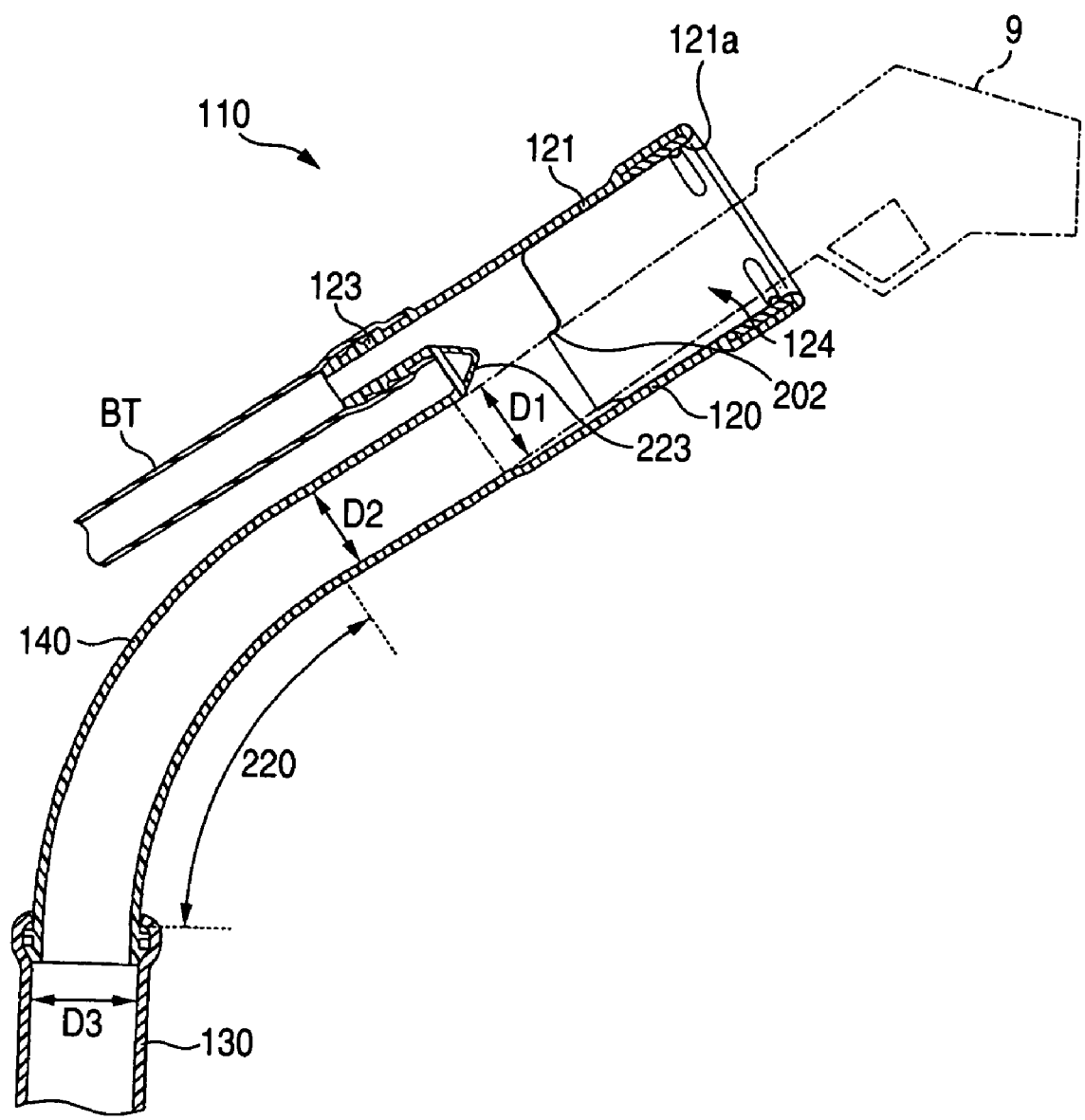
FIG. 8 is an enlarged view of the filler device in FIG. 7.

The second embodiment of the filler device of the invention will be described below. FIG. 7 is a longitudinal sectional view showing the filler device of the second embodiment, and FIG. 8 is an enlarged view showing the upper part of the filer device of FIG. 7. As shown in these figures, the filer device 110 includes a filler neck 120 and a connection pipe 130.

The filler neck 120 is made of polyethylene (PE) and is formed by blow forming. The filler neck 120 is provided with a neck body 121, a breather connection portion 123 and pipe connection portion 140.

The neck body 121 has a shape like a cup, so that an opening is formed on an upper side of the neck body 121. On the upper end of the neck body 121 is projected inside the inlet box (not-shown). A pouring inlet 121a is opened at the upper end of the neck body 121. An attachment metal 124 is inserted and fitted on an inner circumferential side of the pouring inlet. The attachment metal 124 also has a shape like a cup, so that an opening is formed on an upper side of the attachment metal 124. The filler cap (not-shown) is screw-fitted on the attachment metal 124. On the bottom wall of the attachment metal 124, a gun insertion port 202 is bored. A fuel gun 9 (shown with chain lines) is inserted into the filler neck 120 through the pouring inlet 121a. A leading end of the fuel gun 9 is inserted into the gun insertion port 202. Incidentally, an outer diameter D1 of the leading end of the fuel gun 9 is 20 mm.

The breather connection portion 123 is formed so as to project downward from a bottom wall of the neck body 121. A breather pipe BP is fitted on an outer circumference the breather connection portion 123 at a lower end of the breather connection portion 123. The breather pipe BP connects the fuel tank FT with the breather connection portion 123.

The pipe connection portion 140 is formed adjacent to the breather connection portion 123 so as to project downward from the bottom wall of the neck body 121. The pipe connection portion 140 is included as the smaller diameter section of the invention. An inner diameter D2 of the pipe connection portion 140 is 22 mm. That is, the inner diameter D2 of the pipe connection portion 140 represents 110% of the outer diameter D1 of the fuel gun 9. At a lower end of the pipe connection portion 140, the connection pipe 130 (described later) is fitted on an outer circumference of the pipe connection portion 140. An upstream curved part 220 is formed in a section between a middle portion and the lower end of the pipe connection portion. The upstream curved part 220 corresponds to the curved part "which is located in the most upstream side" of the invention. A radius of curvature of the upstream curved part is 100.

On the upstream side of the pipe connection portion 140, the guide part 223 is provided. The guide part 223 is tapered so that section of the flow is narrowed to the downstream side. The guide part 223 is served for positioning the leading end of the fuel gun 9.

The connection pipe 130 is made of polyamide 11 (PA 11) for example, and is formed in a bellows tube by extrusion blow forming. The connection pipe 130 is included in a larger diameter portion of the invention. An inner diameter D3 of the connection pipe 130 (the inner diameter D3 corresponds to the inner diameter at root portions of the bellows in the downstream curved part 136 described later) is 26 mm. That is, the inner diameter D3 of the connection pipe 130 represents 118% of the inner diameter D2 of the pipe connection portion 140. As described above, the upper end of the connection pipe 130 is fitted to the outer circumference of the pipe connection portion 140 at its lower end. On the other hand, the lower end of the connection pipe 130 is communicated with an inside of the fuel tank FT. The downstream curved part 136 is provided between the upper end and the lower end of the connection pipe 130. The downstream curved part 136 has a bellows shape.

Next, the description is given to the operation of the filler device according to this embodiment. The fuel gun 9 is inserted into the filler neck 120 through the pouring inlet 121a. The leading end of the inserted fuel gun 9 penetrates through the gun insertion port 202 and abuts with the inner circumference of the pipe connection portion 140. The fuel is ejected from the leading end of the fuel gun 9. The ejected fuel is introduced into the pipe connection portion 140. The introduced fuel flows downward along the upstream curved part 220 while changing its flow direction so as to be introduced into the connection pipe 130. The introduced fuel in the connection pipe 130 passes through the downstream curved part 136 and is introduced into the fuel tank FT through a check valve (not-shown).

Next, the description is given to advantages of the filler device of this embodiment. According to the filler device 110 of the second embodiment, the fuel ejected from the fuel gun 9 is initially introduced into the pipe connection portion 140 which has a small diameter. Therefore, the fuel is hardly diffused. Further, since the fuel is hardly diffused, turbulence in the flow of the fuel hardly occurs. Besides, the leading end of the fuel gun 9 abuts with the inner circumference of the pipe connection portion 140, and the upstream curved part 220 is provided in the pipe connection portion 140. In other words, the section between the leading end of the fuel gun 9 and the upstream curved part 220 is formed to have the smaller inner diameter by the pipe connection portion 140. Accordingly, the fuel is hardly bounced back at the upstream curved part 220. As a result, the decrease in the flow rate of the fuel can be prevented toward a downstream side of the upstream curved part 220.

Further, the connection pipe 130 having a larger diameter is continued to the downstream side of the pipe connection portion 140 of the filler device 110 according to the second embodiment. By this construction, the fuel can flow easily even after the volume of the fuel is increased by involving the air.

Thus, in the filler device of the second embodiment the fuel flows easily. Therefore, the fuel can be easily introduced in the filling operation.

In the filler device of the second embodiment, the inner diameter D2 of the pipe connection portion 140 is set to be 110% of the outer diameter D1 of the leading end of the fuel gun 9. Besides, the inner diameter D3 of the connection pipe 130 is set to be 118% of the inner diameter D2 of the pipe connection portion 140. Therefore, the fuel gun 9 can be easily inserted. Moreover, the outer diameter of the filler device cannot be excessively large.

According to the filler device 110 of the second embodiment, even though the radius of the curvature is set to be 140 at the upstream curved part 220, the flow resistance at introducing the fuel remains small. In the filler device 110 of the second embodiment, the pipe connection portion 140 is exposed to the outside of the filler device 110. In other words, no component is provided on the outer circumference of the pipe connection portion 140. Therefore, a smaller diameter is required for the outer diameter of the filler device 110. Further, a smaller number of the components are required. Furthermore, any component provided on the outer circumference of the pipe connection portion 140 does not interfere with the breather pipe BP which is arranged around the pipe connection portion 140. Moreover, in the filler device 110 of the second embodiment, the inner circumference of the up stream curved part 220 is formed flat.

Therefore, the flow resistance is small as compared with a case that the curved part is formed with a bellows.

Embodiment of the invention is not limited to the above-described embodiments. Various modifications and improvements may be applied to the described embodiment.

In the above second embodiment, the filler neck 120 and the connection pipe 120 are made of PE or PA. However, the material of the filler neck 120 and the connection pipe 130 should not be limited to PE and PA. They may be made of polyamide (PA), polyphenylene sulfide (PPS), polyethylene terephthalate (PET), polybutylene terephthalate (PBT), polyoxymethylene (POM). Further, in a case that a PE resin which has a low anti-permeablility to the fuel is used, a barrier layer may be formed with PA, ethylene-vinylalcohol copolymer, fluorocarbon polymer or the like having high anti-permeablility to the fuel.

Further, in the second embodiment, the connection pipe 130 is fitted to the outer circumference of the filler neck 120. However, the filler neck 120 and the connection pipe 130 may be coupled to each other by welding. Moreover, the filler neck 120 and the connection pipe 130 may be integrally formed by blow forming or the like. In the case that the filler neck 120 and the connection pipe 130 are integrally formed by the blow forming, the difference between the inner diameter D2 of the pipe connection portion 140 and the inner diameter D3 of the connection pipe 130 may be formed with mold surfaces of a blow mold. While the filler neck 120 is formed by the blow forming in the above embodiment, the filler neck 120 may be formed by injection molding or the like.

What is claimed is:

1. A filler device comprising:
    a filler neck including a pouring inlet through which a fuel is injected and a neck connection portion;
    a connection pipe including a pipe connection portion to which the neck connection portion is connected and a curved part which is curved along a filling passage through which the fuel injected from the pouring inlet is fed into a fuel tank, the connection pipe including a bellow part for the curved part and being provided with a pipe-side engaging portion on a downstream side of the pipe connection portion; and
    an inner tube including a tube body inserted into the connection pipe and a tube-side engaging portion projecting from an outer circumference of the tube body, an inner circumference of a part of the inner tube being flat and covering a curved part of the connection pipe about the bellows;
    wherein the tube body covers an inner wall of the curved part and the tube-side engaging portion is engaged with the pipe-side engaging portion.

2. A filler device according to claim 1, wherein an inner diameter of the discharging outlet of the neck connecting portion and an inner diameter of the inner tube have a same dimension so that the filling passage is continuous.

3. A filler device according to claim 1, wherein the tube body is formed of a flexible elastomer material.

4. A filler device according to claim 1, wherein the filler neck includes a discharging outlet connected with the connection pipe up in a breather connection portion thereto.

5. A filler device according to claim 1, wherein the connection pipe includes plural bellows parts, the inner tube covers the inner wall of the bellows part which is located on the most upstream side.

6. A filler device according to claim 1, wherein an inner diameter of the inner tube is set to be more than 100% and not more than 135% with respect to an outer diameter of a leading end of a fuel gun.

7. A filler device according to claim 1, wherein the inner diameter of the connection pipe is set to be not less than 110% and not more than 150% with respect to an inner diameter of the inner tube.

8. A filler device according to claim 1, wherein the pipe-side engaging portion is configured by expanding a part of the connection pipe.

9. A filler device according to claim 1, wherein a part of the pipe-side engaging portion is formed with a part of the bellows part.

10. A filler device according to claim 1, wherein a plurality of the tube-side engaging portions are formed at four positions in equal interval of 90° in a circumferential direction of the inner tube.

11. A filler device according to claim 1, wherein the tube-side engaging portion is formed in an annular projection.

12. A filler device comprising:
    a filler neck including a pouring inlet through which a fuel is injected and a neck connection portion;
    a connection pipe including a pipe connection portion to which the neck connection portion is connected and a curved part which is curved along a filling passage through which the fuel injected from the pouring inlet is fed into a fuel tank, the connection pipe being provided with a pipe-side engaging portion on a downstream side of the pipe connection portion; and
    an inner tube including a tube body inserted into the connection pipe and a tube-side engaging portion projecting from an outer circumference of the tube body, a leading end of the inner tube being slanted;
    wherein the tube body covers an inner wall of the curved part and the tube-side engaging portion is engaged with the pipe-side engaging portion.

* * * * *